United States Patent [19]

Karlsson

[11] Patent Number: 5,077,852

[45] Date of Patent: Jan. 7, 1992

[54] LOADING RAMPS

[75] Inventor: Göran Karlsson, Västerås, Sweden

[73] Assignee: Kvistberga Produkter HB, Sweden

[21] Appl. No.: 701,619

[22] Filed: May 14, 1991

Related U.S. Application Data

[63] Continuation of Ser. No. 504,559, Apr. 3, 1990, abandoned.

[30] Foreign Application Priority Data

Apr. 3, 1989 [SE] Sweden .................................. 8901161

[51] Int. Cl.⁵ ........................ E01D 15/12; B65G 69/28
[52] U.S. Cl. ..................................... 14/69.5; 14/71.1;
193/38; 193/41; 414/537
[58] Field of Search ................ 14/69.5, 71.1; 414/397,
414/401, 537; 238/10 R; 182/195, 223;
403/377; 193/38, 41

[56] References Cited

U.S. PATENT DOCUMENTS

| 981,613 | 1/1911 | Carter | 14/69.5 |
|---|---|---|---|
| 3,556,254 | 1/1971 | Lambert et al. | 182/223 |
| 4,528,711 | 7/1985 | Packer | 14/69.5 |
| 4,601,632 | 7/1986 | Agee | 414/537 |
| 4,726,516 | 2/1988 | Cree | 238/10 R |
| 4,912,796 | 4/1990 | Crump | 14/71.1 |

FOREIGN PATENT DOCUMENTS 8004947-1 5/1982 Sweden .
8502266-3 11/1985 Sweden .

Primary Examiner—Bruce M. Kisliuk
Attorney, Agent, or Firm—Klarquist, Sparkman, Campbell, Leigh & Whinston

[57] ABSTRACT

An arrangement for limiting the extent to which telescopically mounted sections (1,2,3) can be extended is enclosed in a chamber (7) between each pair of sections, so as to be out of the way of personnel handling the sections. The arrangement comprises two mutually co-acting devices which have the form of hollow bodies (5) and which are intended to engage one another when the sections of a pair of sections are extended to a maximum. The mutually facing surfaces of the hollow bodies are preferably provided with a damping ramp section (8).

8 Claims, 3 Drawing Sheets

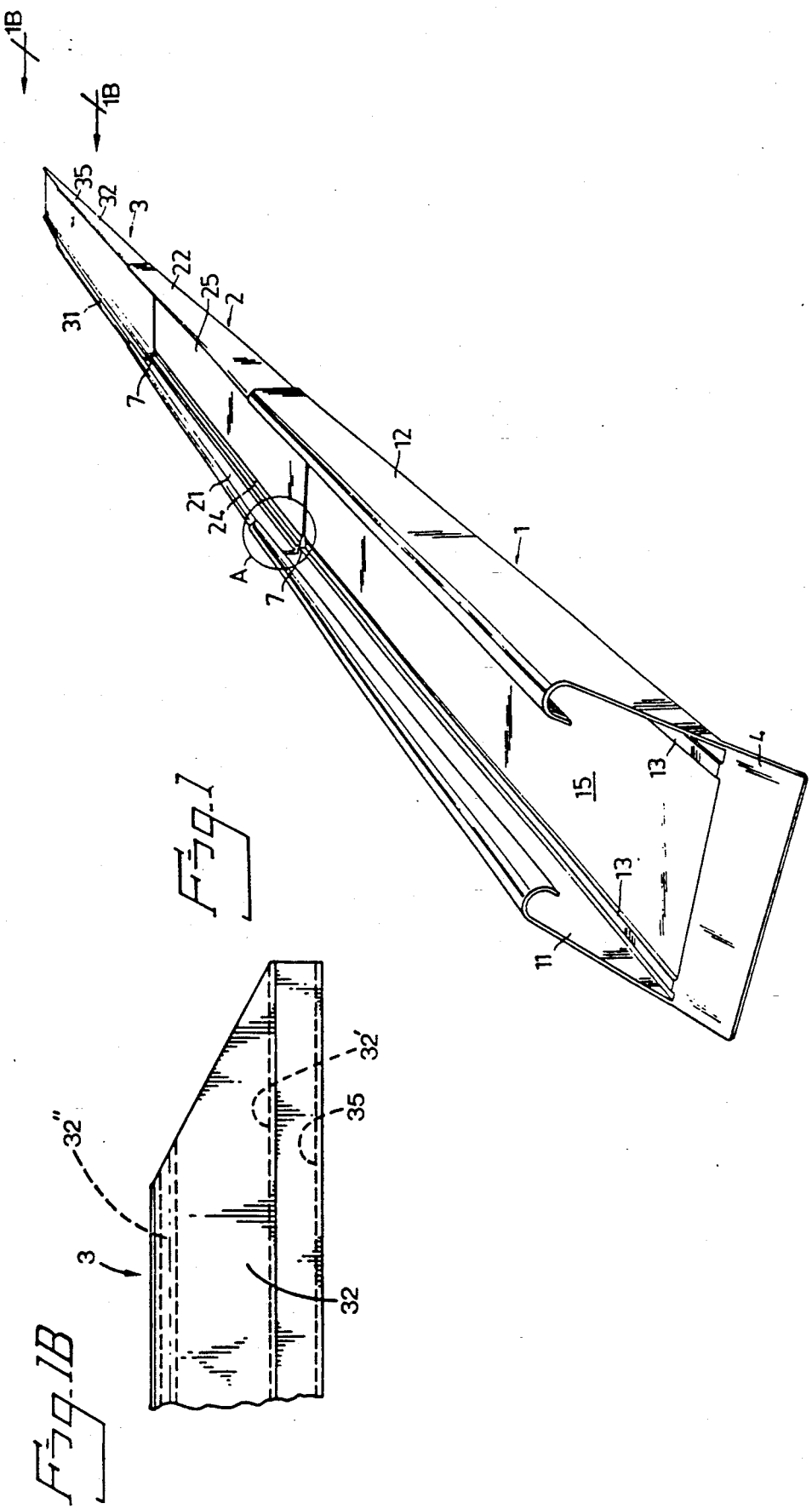

LOADING RAMPS

This application is a continuation of application Ser. No. 07/504,559, filed Apr. 3, 1990, now abandoned.

TECHNICAL FIELD

The present invention relates to telescopically assembled ramp sections, and particularly to profiled ramp sections which form part of a loading ramp. More particularly, the invention relates to an arrangement which is operative to restrict extensibility between the ramp sections, wherein mutually co-acting devices are provided between each pair of ramp sections.

BACKGROUND ART

Extensible loading ramps of the kind used in pairs as supports for the wheels of vehicles to be transferred from one plane to another are well known to the art, for instance from Swedish Patent 8004947-1 (publication No. 423 223). In the case of these known ramps, the extensibility between the ramp sections is restricted by mutually co-acting devices provided on the ends of the upstanding side members of said ramp sections, as illustrated in FIG. 3 of Swedish Patent Application 8502266-3, for instance. These ramps are provided with sheet-metal and/or rod-like stop devices which engage one another when the ramp is extended to its maximum, therewith preventing further extension of the ramp.

These stop devices are directed in towards the carriageway on respective ramps and therewith are liable to present an obstacle to passage of the vehicles along said ramps. A more serious drawback, however, is that stop devices of this kind have caused accidents or have been the cause of accidents, since the stop devices are within reach of the personnel handling the ramp, and consequently are liable to cause squeezing, pinching or squashing of the hands and fingers, for instance when extending the ramp.

SUMMARY OF THE INVENTION

The object of the present invention is to avoid the aforesaid drawbacks while, at the same time, endeavouring to provide more stable stopping devices which, advantageously, will not give rise to unnecessary noise.

These objects are achieved by enclosing the stop devices or limiting devices co-acting with the aforedescribed telescopically assembled ramp sections in a protecting chamber which is defined by the mutually facing surfaces of the ramp sections forming a pair of ramp sections. The chamber is arranged in the vicinity of the slide-surfaces of the ramp sections.

Advantageous embodiments and further developments of the invention are set forth in the depending claims.

DESCRIPTION OF PREFERRED EMBODIMENTS

The inventive arrangement will now be described in more detail with reference to the accompanying drawings, in which FIG. 1 illustrates an embodiment of the inventive arrangement applied to a three-section loading ramp, shown in its extended state.

FIG. 1B illustrates in larger scale a side elevational view of a portion of the ramp of FIG. 1, taken along lines 1B—1B of FIG. 1;

Figure 1A:
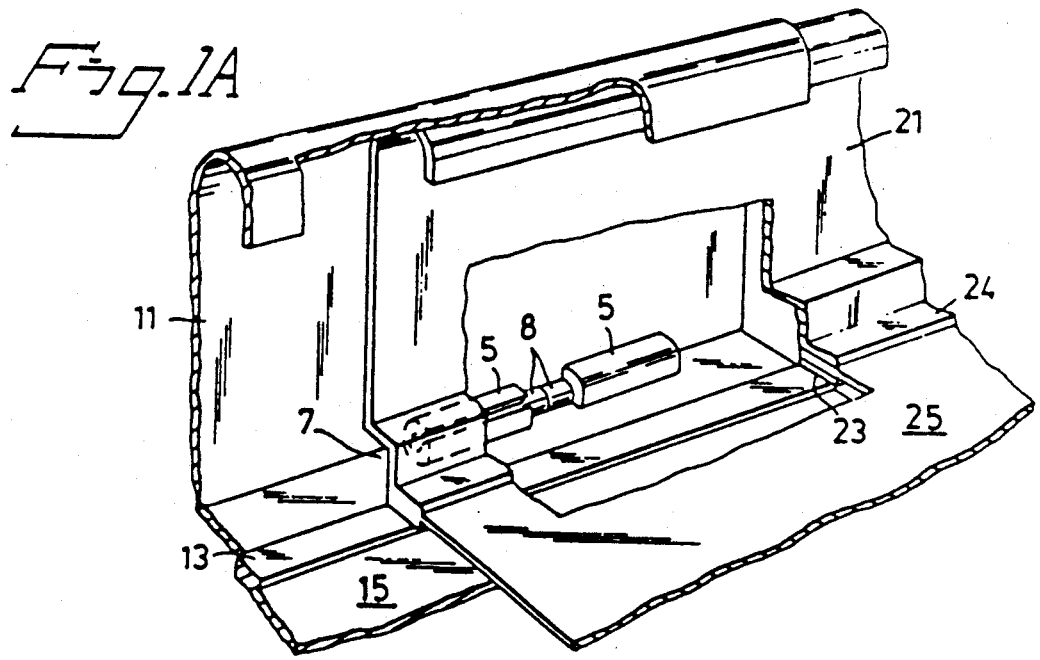
FIG. 1A illustrates in larger scale, and partly in section, a detail between two of the extended ramp sections marked A in FIG. 1, and illustrates the co-action between the stop jaws provided in the inventive arrangement.
Figure 2:
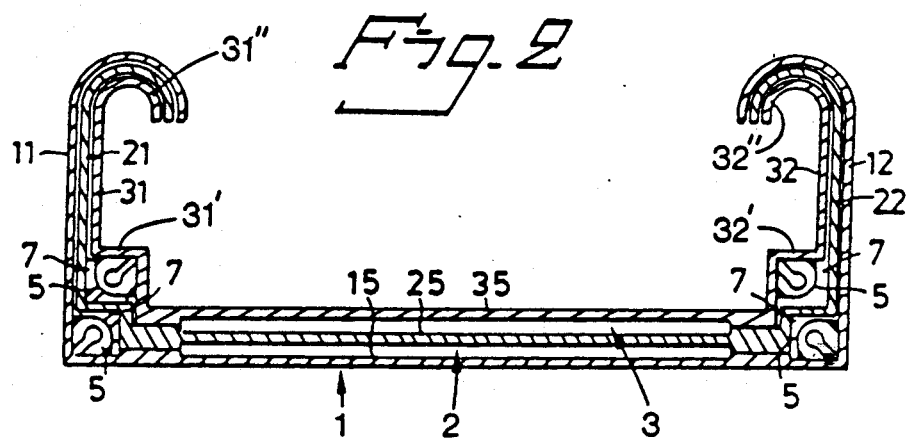
FIG. 2 is a cross-sectional view of the three-section loading ramp of FIG. 1, and shows the ramp in its collapsed state.
Figure 3:
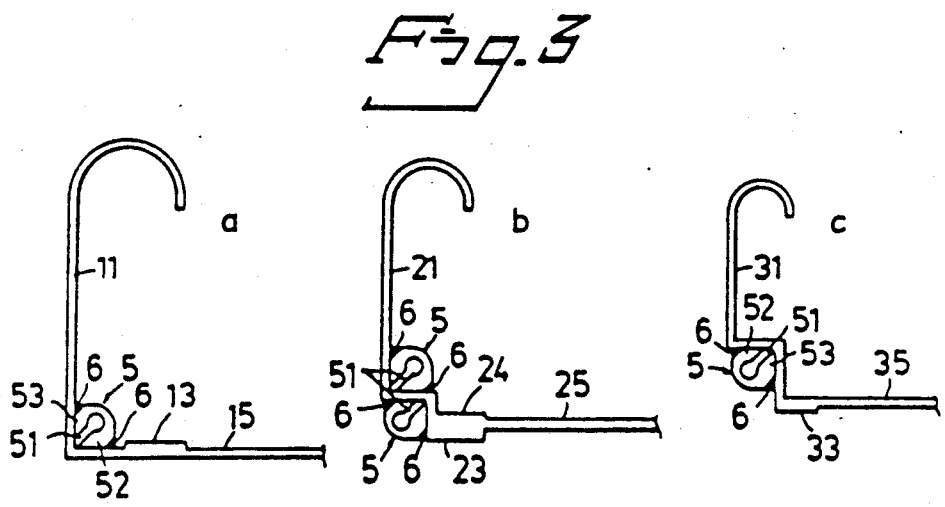
Figure 4:
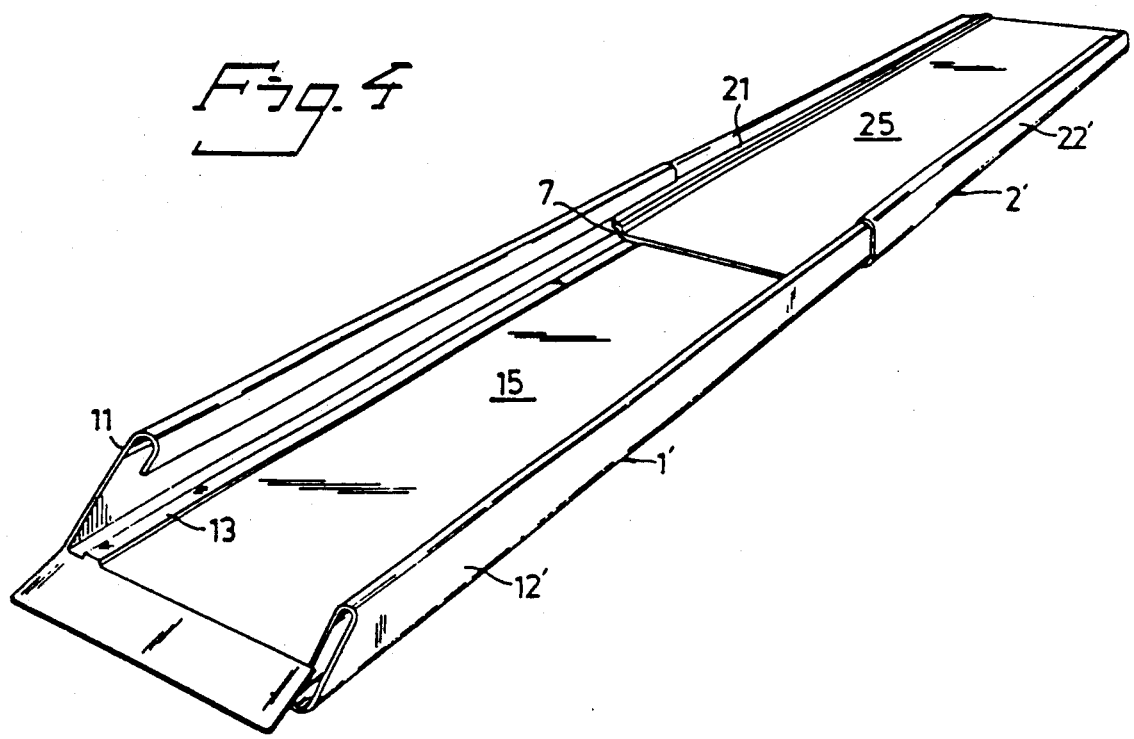
Figure 5:
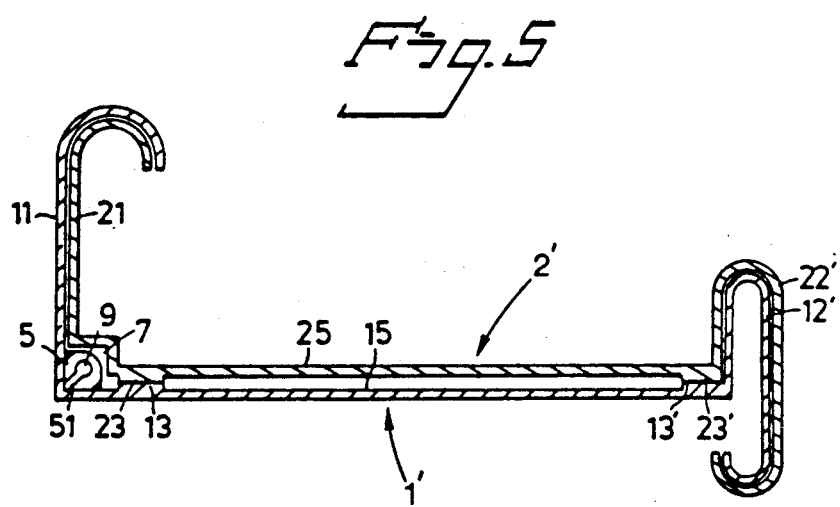

FIGS. 3a–c illustrate the substantially L-shaped cross-section of respective ramp sections taken along different locations in the loading ramp illustrated in FIG. 1 with FIGS. 3a–3c being partial end views of the ramp sections disassembled from the collapsed view of FIG. 2;

FIG. 4 illustrates a two-section loading ramp of modified cross-section and provided with the inventive arrangement; and FIG. 5 illustrates a cross-section of a two-section loading ramp which corresponds to the cross-section illustrated in FIG. 2.

Telescopic loading ramps comprise two or more mutually collapsible and extensible ramp sections. FIGS. 1 and 2 illustrate one such three-section loading ramp which comprises three ramp sections 1, 2 and 3. FIG. 1 shows the loading ramp extended, with the bottom ramp section 3 being shown furthest away and being intended to rest on the ground surface or the floor. The ramp section 1 nearest the viewer in FIG. 1 is provided with a tongue 4 which is intended to rest on the edge of a loading dock or platform, on the chassis of the passenger compartment of a minibus or the like. The three-part loading ramp has a U-shaped cross-section as illustrated in FIG. 2, this Figure showing the ramp in its collapsed state.

Each of the ramp sections 1, 2, 3 has upstanding flanges 11, 21, 31, 12, 22, 32 which are gently arched along their upper side edges. The flanges 31, 32 of the bottom ramp-section 3 have respective platform portions 31' and 32', arches which terminate in respective downwardly turned portions 31'' and 32''(see FIG. 2), and are bevelled down (see FIG. 1B), so that vehicles such as wheelchairs, garden equipment or the like to be rolled up on the ramp will not be caught up or impeded by the junction from the flat ground surface to the often pronouncedly inclined loading ramp. Each ramp section 1, 2, 3 is provided with slide surface intended for co-action with mutually adjacent ramp sections. Thus, two mutually adjacent ramp sections 1, 2 or 2, 3 can be considered to form ramp section pairs 1-2 and 2-3, respectively. The ramp section 1 has solely upwardly facing slide surfaces 13 which are intended to co-act with downwardly facing slide surfaces 23 on the second ramp section 2. The second ramp section 2 is also provided with upwardly facing slide surfaces 24 which are intended to co-act with the downwardly facing slide surfaces 33 on the third ramp section 3. The slide surfaces 13, 23, 24, 33 are disposed in the immediate vicinity of the junction point, i.e. the angled part between the drive surfaces 15, 25, 35 on the ramp sections 1, 2, 3 and the flanges 11, 12, 21, 22, 31, 32 on said sections. The drive surface 15, 25, 35 thus forms an L-shaped cross-section with each flange 11, 12, 21, 22, 31, 32 on respective ramp sections 1, 2, 3. The slide surfaces 13, 23, 24, 33 and the arched upper sides of the flanges enable the ramp sections 1, 2, 3 to move telescopically one within the other, the ramp section 1 having the largest width and height dimensions, whereas the ramp section 3 has the smallest width and height dimensions, so that the ramp section 3 can be inserted into the ramp section 2, which can be inserted into the ramp section 1.

In order to limit the extent to which each ramp section 1, 2, 3 can be extended, each ramp section 1, 2, 3 is configured, in accordance with the invention, with a stop show or block 5, best seen from FIG. 1A. These stop shoes 5 are mounted adjacent at least one flange of respective ramp sections 1, 2, 3. The stop shoes 5 are attached to respective ramp sections 1, 2, 3 by means of welds 6 on the flange wall in the immediate vicinity of the angle part of the L-shaped cross-section. The mutually facing flange walls of two ramp sections in a pair of ramp sections 1-2, 2-3, form at said angle part a chamber 7 in which the stop shoes 5 are readily accommodated. The stop shoes 5 on two ramp sections within a pair of ramp sections 1-2, 2-3, are disposed so as to engage one another when said ramp section pair has been extended to a maximum, such as to prevent further extension.

FIG. 2 illustrates an embodiment of a three-section loading ramp in which stop shoes 5 are mounted on both flange sides of respective ramp sections 1, 2, 3. It will be understood, however, that it will suffice to provide stop shoes solely on one flange side, as evident from FIGS. 4 and 5, which illustrate a two section loading ramp in which respective ramp sections 1', 2' have a modified cross-sectional shape.

This modified loading ramp which may, of course, comprise three or more ramp sections, has a flange side on which stop shoes 5 are mounted. This flange side has the same configuration as those described above with reference to FIGS. 1 and 2 and has consequently been identified with the same reference sign. The opposite flange side of the modified loading ramp presents support edges 12', 22', the height of which is roughly half of the height of the opposite flange, so as to enable vehicles fitted with small wheels and/or having a low chassis to pass the loading ramp, while the support edges 12', 22' still provide steering support for those vehicles to be driven up on the ramp.

The stop shoes 5 are configured as a hollow body provided with a longitudinally extending slot 51 which divides the hollow body into two leg sections 52, 53. The leg sections 52, 53 are adapted for welding (6) onto respective flange walls, as clearly shown in FIGS. 3a–c. FIG. 3a illustrates the substantially L-shaped cross-section of the ramp section 1 or 1'. FIG. 3b illustrates a correspondingly substantially L-shaped cross-section of the ramp section 2 or 2', while FIG. 3c illustrates the substantially L-shaped cross-section of the ramp section 3.

As will be seen from FIG. 1A, the mutually facing support surfaces of the stop shoes 5 are conveniently configured with damping elements 8. The damping elements 8 are made of rubber or some similar resilient material and can be attached in through holes 9 provided in the stop shoes 5.

Both the ramp sections 1, 2, 3 or 1', 2' and the stop shoes 5 may be manufactured advantageously from aluminium, for instance by continuous casting methods.

Although the inventive arrangement has been described in the aforegoing with reference to loading ramp sections, it will be understood that the inventive arrangement can also be used with other telescopically extensible sections. Furthermore, the hollow body provided with a damping element can also be given other configurations in accordance with the inventive concept.

I claim:

1. An arrangement for limiting the extensibility between at least two telescopically assembled sections which are particularly profiled sections forming part of a loading ramp, and comprising mutually co-acting means provided between each pair of sections, each pair of sections having co-acting slide surfaces and mutually opposing surfaces of each section, and further characterized in that the mutually co-acting means are enclosed in a protecting chamber defined by the mutually opposing surfaces of the sections forming a pair of sections, said chamber being arranged in the vicinity of the slide surfaces of said sections, with each section comprising an elongated section having a longitudinal direction and at least one part having a substantially L-shaped cross-section defining an angle part, said chamber being configured as a channel in the immediate proximity of the angle part of said cross-section and in the longitudinal direction between two vertical walls, each vertical wall being of one section of a pair of sections, said walls being displacable in relation to one another, each of the mutually co-acting means comprises a stop shoe attached to a respective ramp section, and in that the stop shoes on the sections forming a pair of sections are intended to engage one another when said sections are extended to a maximum in relation to one another, at least one stop shoe in a pair of ramp sections is provided with a damping element on the surface thereof which faces the other stop shoe, and further characterized in that the stop shoe has the form of a hollow body with a through-passing hole which forms attachment means for the damping element.

2. An arrangement according to claim 1, characterized in that the hollow body has a longitudinally extending slot which divides the stop shoe into two leg sections to be welded to those parts of a wall of the ramp section defining the chamber.

3. An arrangement for limiting the extensibility between telescopically assembled ramp sections, each ramp section particularly profiled with a drive surface located between two upstanding flanges for forming part of a loading ramp, said arrangement comprising mutually co-acting means provided between each pair of ramp sections, each pair of ramp sections having co-acting slide surfaces and mutually opposing surfaces, wherein the mutually co-acting means are enclosed within a protecting chamber configured as an enclosed channel defined by the mutually opposing surfaces of the pair of ramp sections, a portion of the drive surface of one ramp section and an undersurface portion opposite a portion of the drive surface of the other of the pair of ramp sections, with the length of said enclosed channel protecting chamber configuration being defined by the mutually co-acting means, said chamber being arranged in the vicinity of the slide surfaces of said ramp sections, with the slide surface of one ramp section of a ramp section pair being elevated above the drive surface of said one ramp section, with each ramp section comprising an elongated section having a longitudinal direction and at least one part with a substantially L-shaped cross-section defining an angle part, said chamber being located in the immediate proximity of the angle part of said cross-section and enclosed to prevent accidental operator access thereto during use, said ramp sections being displacable in relation to one another.

4. An arrangement according to claim 3, characterized in that each of the mutually co-acting means comprises a stop shoe attached to a respective ramp section, and in that the stop shoes on the sections forming a pair of sections are intended to engage one another when said sections are extended to a maximum in relation to one another.

5. An arrangement according to claim 4, characterized in that at least one stop shoe in a pair of ramp sections is provided with a damping element on the surface thereof which faces the other stop shoe.

6. A telescopic loading ramp, comprising:
   at least two ramp elongated sections forming a pair of sections,
      each ramp section particularly profiled with a drive surface located between two upstanding flanges for forming part of a loading ramp, each ramp elongated section having a longitudinal direction along the length thereof and a cross-section with at least one portion having a substantially L-shape defining an angle part,
      each pair of ramp sections having co-acting slide surfaces and mutually opposing surfaces of the upstanding flanges of each ramp section defining therebetween a protecting chamber in the vicinity of the slide surfaces, the chamber being configured as a channel extending in the longitudinal direction between the mutually opposing surfaces in the immediate proximity of the angle part, the sections of each pair being displacable in relation to one another; and
   a pair of co-acting stop shoes provided between each pair of ramp sections, for limiting the extensibility between telescopically assembled sections, each stop shoe being coupled to one of the ramp sections and enclosed within the protecting chamber.

7. A telescopic loading ramp according to claim 6 wherein each stop shoe is attached to a ramp section so as to engage a stop shoe on the other of the pair of ramp sections when said sections are extended to a maximum position with respect to one another.

8. A telescopic loading ramp according to claim 7 further including a damping element attached to at least one stop shoe on a surface thereof which faces said stop shoe on the other of the pair of ramp sections.

* * * * *